United States Patent [19]

McGuire

[11] 4,226,029

[45] Oct. 7, 1980

[54] REFLECTIVE TRACING DEVICE

[75] Inventor: Kevin C. McGuire, Sauk Rapids, Minn.

[73] Assignee: Arthur M. Gunderson, St. Cloud, Minn.

[21] Appl. No.: 10,707

[22] Filed: Feb. 9, 1979

[51] Int. Cl.³ .............................................. G09B 11/06
[52] U.S. Cl. ........................................ 35/26; 35/58
[58] Field of Search ............ 33/1 K; 35/26, 58, 22 R; 248/441 A; 350/283, 288, 297, 305, 306

[56] References Cited

U.S. PATENT DOCUMENTS

| 491,160 | 2/1893 | Cross | 35/26 |
|---|---|---|---|
| 942,560 | 12/1909 | Hoyt | 350/297 |
| 1,559,665 | 11/1925 | Beery et al. | 35/26 |
| 4,098,009 | 7/1978 | Flynn | 35/26 |
| 4,168,573 | 9/1979 | Chase | 33/1 K |

FOREIGN PATENT DOCUMENTS

| 634332 | 8/1936 | Fed. Rep. of Germany | 35/26 |
|---|---|---|---|
| 344685 | 3/1931 | United Kingdom | 35/26 |

Primary Examiner—Harland S. Skogquist
Attorney, Agent, or Firm—Leo Gregory

[57] ABSTRACT

A therapeutic educational tracing device consisting of a transparent panel having an eraseable surface, a transparency bearing indicia removably disposed to underlie the panel, a rearwardly disposed mirror angled to reflect the indicia and thus enable a child tracing the indicia to perceive his hand and the indicia in the mirror and perceptually guide his hand in tracing the indicia by a mental process.

5 Claims, 6 Drawing Figures

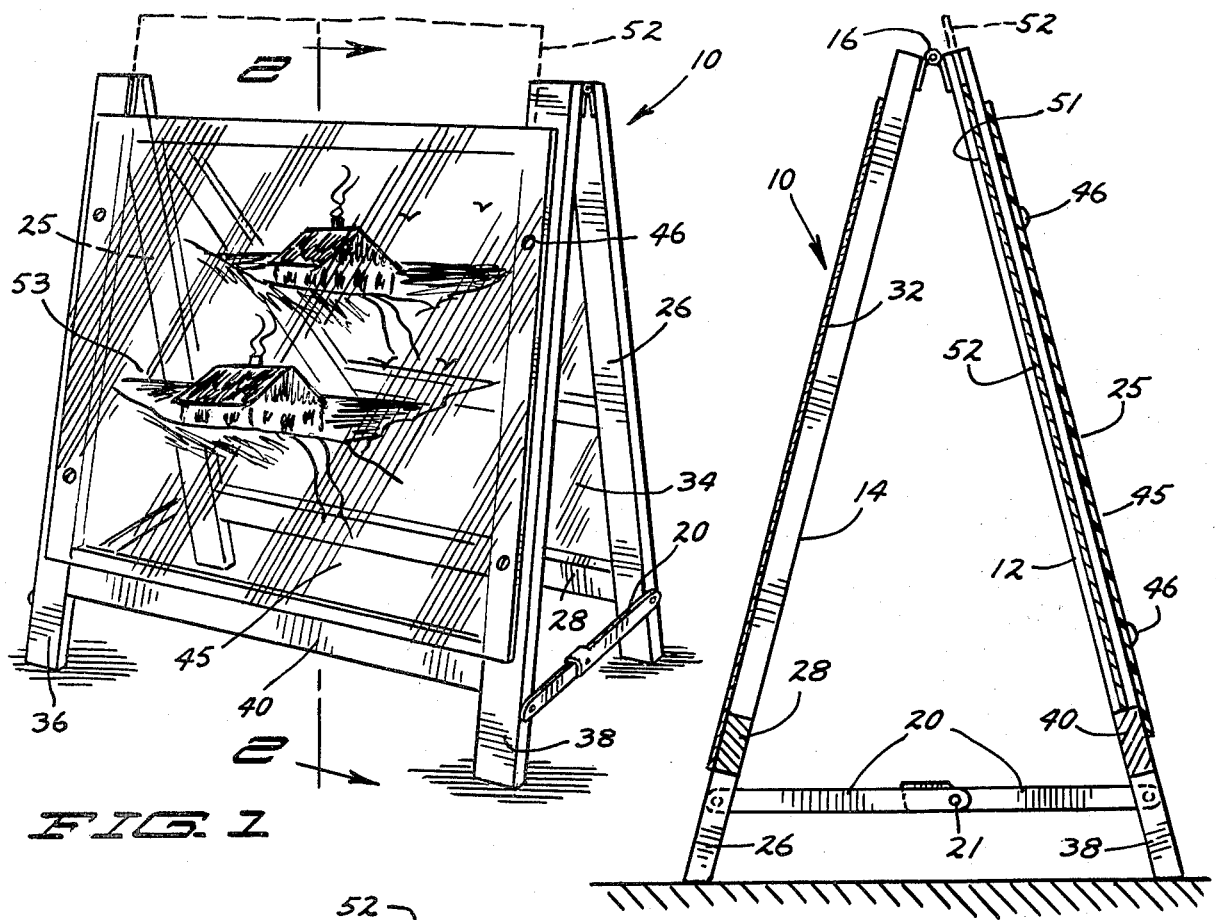
FIG. 1
FIG. 2
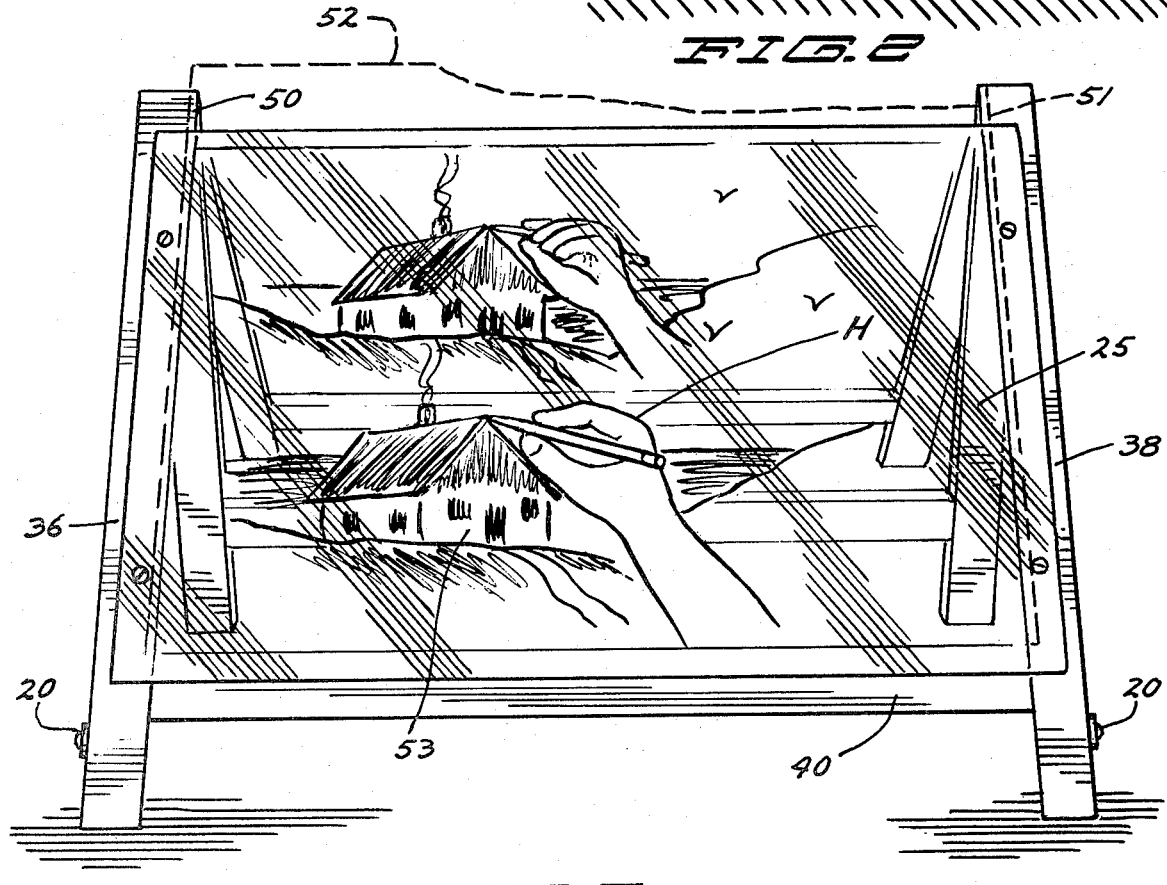
FIG. 3

REFLECTIVE TRACING DEVICE

BACKGROUND OF THE INVENTION

1. Field of the Invention.

This invention relates to a therapeutic educational device for tracing indicia by mentally guiding a hand observed with the indicia upon a reflective surface.

2. Description of the Prior Art.

The principal of learning by tracing is known in the art and skills of children are developed by tracing.

The improvement therein consists of tracing indicia upon a transparent panel as viewed upon a reflective surface, the guidance for the act of tracing coming from a perception of the same upon said reflective surface.

SUMMARY OF THE INVENTION

The invention herein relates to a device intended to have therapeutic and educational value in training developing hand tracing skills and being of particular benefit in training slow to learn children by providing them with a device which enables them to trace indicia in many forms upon a clear panel from an observation of the reflection of the act of tracing in a mirror whereby in an objective manner the children identify themselves as being the doer and in effect they direct the observed image of their hands in the act of tracing.

It is an object of this invention therefore to provide a structure which supports a transparent panel having an eraseable surface, said supporting structure permitting a transparency bearing indicia to be removably disposed to underlay said panel and a mirror being supported by said structure having an angled relationship with said panel whereby said indicia is reflected in the mirror together with the hand tracing the indicia, the person directing the act of tracing by the mental process of directing the reflected image of the hand.

More specifically it is an object of this invention to provide an easel structure having the forward supporting portion thereof bear a transparent panel, said support structure being slotted to receive a transparency bearing indicia, the same being removably disposed within said slots and a mirror supported by the rear support structure of said easel and being angled in such a manner that the indicia is clearly reflected by the mirror and the person copying the indicia may do so by observing his hand in the act of tracing said indicia in the reflection upon the mirror.

These and other objects and advantages of the invention will be set forth in the following description made in connection with the accompanying drawings in which like reference characters refer to similar parts throughout the several views.

DESCRIPTION OF THE DRAWINGS

FIG. 1 is a view in perspective showing an extension of a portion thereof in dotted line;

FIG. 2 is a view in vertical section taken on line 2—2 of FIG. 1;

FIG. 3 is a front plan view showing a portion thereof in dotted line;

DESCRIPTION OF A PREFERRED EMBODIMENT

Figure 4:
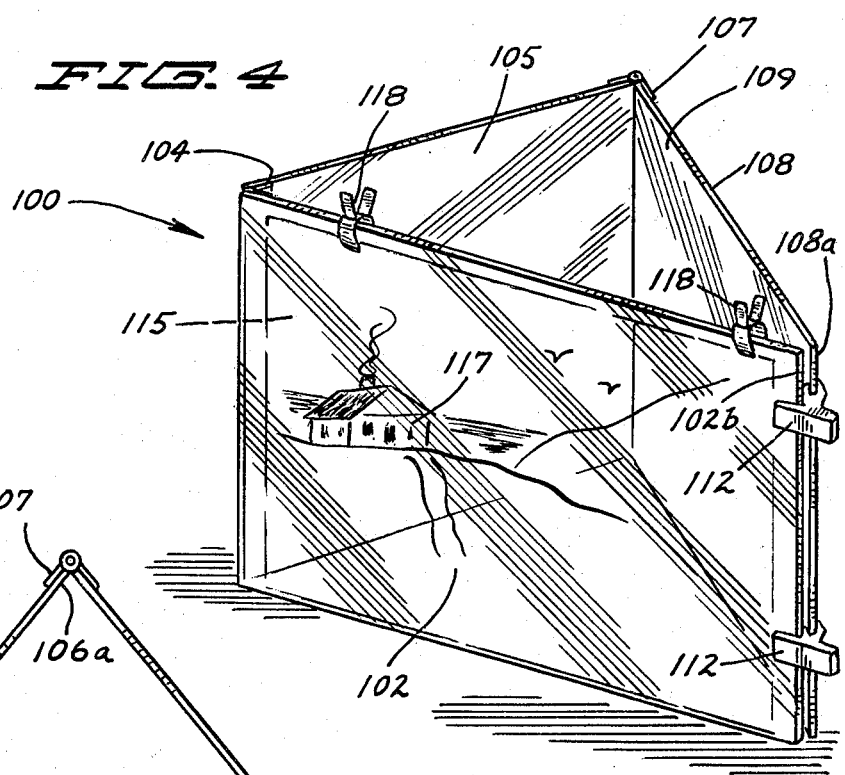
FIG. 4 is a view of a modification in perspective.

Referring to the drawings, an easel like supporting structure 10 is shown having an upwardly rearwardly inclined frame support member 12 and an upwardly forwardly inclined frame support member 14, said frame support members being pivoted and connected at their upper end portions by hinges 16.

Connecting the lower end portions of said frame members in spaced relation are foldable brackets 20 of conventional structure as shown which are medially pivoted as at 21 to be collapsed upwardly to bring said frame support members together for transport or storage.

Said forwardly inclined frame support member 14 comprises full height transversely spaced side support or leg members 25 and 26 having a connecting lower cross member 28. Overlying said frame support member and being secured to said leg members in a suitable manner is a sheet member 32 substantially rectangular in plan as indicated having a forward facing reflective or mirror surface 34.

Said rearwardly inclined frame member 12 comprises a pair of full height spaced side support or leg members 36 and 38 connected by a lower cross member 40. Extending between said side members and overlying the same substantially the full extent thereof is a transparent panel member 45 being secured to said side members as by bolts or rivets 46. Said panel member 45 is suitably formed of a clear plastic material such as Lucite which has a surface 47 from which writing or painting materials are readily erased or removed.

Formed within the facing edge portions of said side members 36 and 38 are a pair of facing open ended slots 50 and 51 extending downwardly from the top thereof to extend the full height of said panel member 45.

Removeably disposed into said slots is shown a transparent sheet member 52 of suitable material, such as a conventional transparency, which will bear indicia 53 and the indicia may take various forms and may be written or printed material for tracing as well as illustrative material such as pictorial scenes.

OPERATION

With respect to FIGS. 1 and 3, it will be appreciated that a person in tracing onto the panel 45 the indicia of the transparency 52 therebelow will be tracing the same by watching the motion of his hand H in the mirrored surface 34. In viewing the object in a mirrored surface, it is as if the object is recessed into the mirrored surface to the extent that the mirrored surface is spaced from the panel 45. The operator such as a student thus has a good objective distant view of his hand motions and this view of himself provides the feeling of objectivity or self analysis and the person learns by observation and directs by perception the motions his hand goes through in the tracing process.

Like methods have been used in educational efforts and the structure herein lends itself very beneficially to the employment of the method herein. This is particularly true with respect to teaching those having some problem with a learning process or having some problem with coordination between thought and a related manual process such as hand and finger motions in tracing material. By such perception as herein indicated through observation of the image of the motion, it has been found that there has been very satisfactory development of hand skills. This type of instruction is readily incorporated into a curriculum and this type of teaching causes the recognition of the presence or absence of the required skill and of the improvement required in the practical application of such skills. The development of tracing skills resulting from the coordination directed by the mental process preceiving the hand in action in tracing material is readily observed.

MODIFICATION

Figure 5:
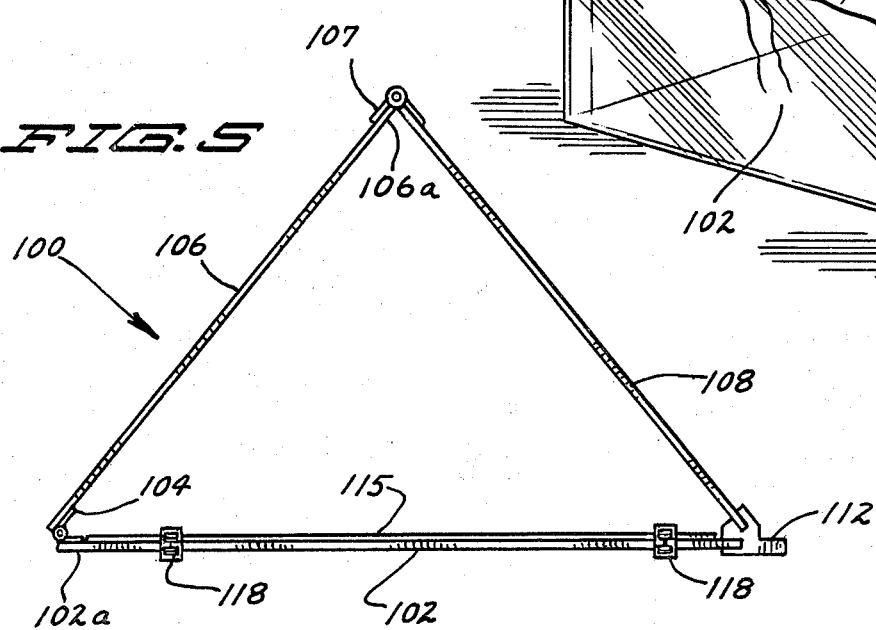
FIG. 5 is a top plan view of said modification.
Figure 6:
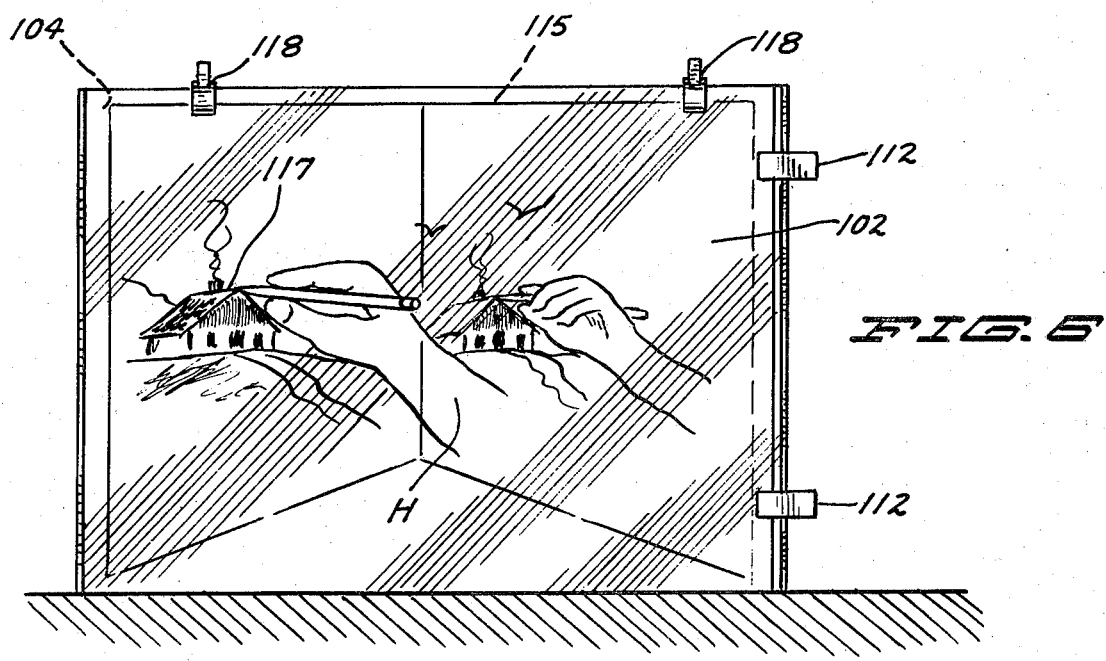
FIG. 6 is a view in front elevation of said modification.

Referring to FIGS. 4–6, a modification is shown comprising a three sided apparatus or device 100 formed as an equilateral triangle in horizontal section having a first panel 102 formed of a suitable transparent material such as Lucite.

Hinged to the end portion 102a of said panel 102 as by a piano hinge 104 is a panel 106 which is non-transparent and has a forward facing mirrored or reflective surface 105.

Hinged to said last mentioned panel at its end portion 106a by a piano hinged 107 secured to the outer surface thereof is a like panel 108 having a forward facing mirror or reflective surface 109. The adjacent ends 108a and 102b of said panels 108 and 102 are removably secured by a pair of slotted holding members 112 each adapted to receive and frictionally hold adjacent edge portions of said panels.

The panels described hereabove are shown for purpose of illustration as being rectangular in plan.

Positioned to underlay said panel 102 shall be a transparent sheet 115 bearing indicia 117 suitably for tracing and being formed as a conventional transparency in the form of either text material of an illustration of some object. Said sheet 115 is shown removeably held by spring clips 118.

A hand and arm portion H is shown in position to trace the indicia onto the panel 102, the act of tracing to be directed by observation of the reflections of this hand and indicia in said mirrored surfaces. It will be understood that the hand H and the indicia being traced will be viewed in either or both of the mirrored surfaces indicated depending upon the position of the hand and indicia transversely of the panel 102 with reference to the angled relationship of said mirrored surfaces 105 and 109.

It is seen that said panels are readily folded upon one another into a flat form for easy transport.

As above described, the structure 100 is easily placed upon a table or onto a floor surface for use under direction in a formal training program or for self-training informally by self use of the apparatus.

A mirrored image view of indicia and a hand permits guidance of the hand through perception of the image without directly observing the hand.

The invention herein described is regarded as providing a significant benefit for use in learning and training programs.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is

1. A perceptual educational tracing apparatus, having in combination
    a transparent panel member,
    a transparent sheet member bearing indicia,
    means removably holding said transparent sheet member to underlay said transparent panel member,
    a panel member having a mirrored surface, and
    means adjustably securing said first and second mentioned panel members relative to each other for reflection of said indicia upon said mirrored surface, whereby there is direct observation of the hand of the operator in tracing said indicia and an observation of said hand as a mirrored image for perceptual guidance of said hand in tracing said indicia as seen upon said mirrored surface.
2. The structure set forth in claim 1, including
    an upwardly inclined frame member supporting said transparent panel member,
    an upwardly inclined frame member supporting said mirrored panel member,
    means hingedly connecting said frame members adjacent their upper end portions,
    means holding said frame members in spaced relation adjacent their bottom portions,
    said first mentioned frame member having a pair of oppositely facing slots rearwardly of said transparent panel member, and
    said transparent sheet member being disposed within said slots.
3. The structure set forth in claim 1, including
    a second panel member having a mirrored surface,
    means positioning said second panel member to reflect said indicia in cooperation with said first mentioned panel member having a mirrored surface.
4. The structure set forth in claim 1, including
    a second panel member having a mirrored surface,
    said panel members being arranged in an upright relationship and positioned to have adjacent end portions,
    means hingedly connecting said adjacent end portions of said panel members, and
    said panel members having mirrored surfaces being arranged to reflect said indicia.
5. A perceptual educational tracing apparatus, having in combination
    a first and second substantially rectangular frame members in plan in opposed upright angled relationship to one another,
    means hingedly connecting said frame members at their adjacent upper portions,
    means holding the lower portions of said frame members in opposed relation,
    a panel member substantially overlying one of said frame members,
    said panel member being transparent,
    a transparent sheet member bearing indicia thereon,
    means removably holding said transparent sheet member to underlay said transparent panel member,
    a panel member substantially overlying said other of said frame members, and
    said last mentioned panel member having a mirrored surface facing said first mentioned panel member and reflecting an image of said indicia.

* * * * *